(12) United States Patent
Tsu (10) Patent No.: US 7,012,874 B2
(45) Date of Patent: Mar. 14, 2006

(54) RECORDING MARK FORMATION IN A PHASE CHANGE MEMORY MATERIAL VIA A PREDOMINATELY CAPACITIVE COOLING PROCESS

(75) Inventor: David Tsu, Auburn Hills, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 475 days.

(21) Appl. No.: 10/026,395

(22) Filed: Dec. 21, 2001

(65) Prior Publication Data

US 2002/0114256 A1    Aug. 22, 2002

Related U.S. Application Data

(60) Provisional application No. 60/258,078, filed on Dec. 22, 2000.

(51) Int. Cl.
G11B 7/00    (2006.01)

(52) U.S. Cl. .................. 369/101; 369/121; 369/126

(58) Field of Classification Search ............ 369/59.11, 369/59.12, 53.26, 47.53, 47.51, 100, 13.26, 369/116

See application file for complete search history.

(56) References Cited

U.S. PATENT DOCUMENTS

| | | | |
|---|---|---|---|
| 3,530,441 A * | 9/1970 | Ovshinsky ................. 365/113 |
| 4,403,318 A * | 9/1983 | Nagashima et al. ........ 369/100 |
| 5,148,335 A * | 9/1992 | Kudo et al. ............... 369/59.11 |
| 5,295,131 A * | 3/1994 | Ishibashi et al. ......... 369/275.3 |
| 5,513,167 A * | 4/1996 | Udagawa et al. ........ 369/59.12 |
| 5,555,537 A * | 9/1996 | Imaino et al. ................. 369/94 |
| 5,642,343 A * | 6/1997 | Toda et al. ............... 369/47.53 |
| 5,646,924 A * | 7/1997 | Nonoyama et al. ...... 369/53.36 |
| 5,818,806 A * | 10/1998 | Wong et al. ............. 369/53.33 |
| 6,169,722 B1 * | 1/2001 | Kikukawa et al. ....... 369/275.4 |
| 6,563,779 B1 * | 5/2003 | McDonald et al. ......... 369/103 |
| 6,775,218 B1 * | 8/2004 | O'Neill et al. ........... 369/59.11 |

* cited by examiner

Primary Examiner—Brian E. Miller
Assistant Examiner—Peter Vincent Agustin
(74) Attorney, Agent, or Firm—Kevin L. Bray; Marvin S. Siskind (57) ABSTRACT

Methods of writing information to an optical memory device. The methods comprise the step of writing a mark to the active material of the optical memory device by irradiating the material with an applied energy source. In one embodiment, the applied energy source provides a plurality of energy pulses. In another embodiment, energy in excess of that required to form a mark is released and dissipated in a manner that minimizes mark enlargement, spurious mark formation, recrystallization and back crystallization. The methods are effective to provide better cooling characteristics through enhancement of the capacitive cooling contribution.

17 Claims, 2 Drawing Sheets

RECORDING MARK FORMATION IN A PHASE CHANGE MEMORY MATERIAL VIA A PREDOMINATELY CAPACITIVE COOLING PROCESS

REFERENCE TO RELATED APPLICATIONS

The instant application is a completion of U.S. provisional application Ser. No. 60/258,078 filed Dec. 22, 2000 and entitled Method of Recording Memory by David Tsu, the disclosure of which is hereby incorporated by reference.

FIELD OF THE INVENTION

The present invention pertains to recording optical memory devices and to multilevel recording of phase change optical memory devices.

BACKGROUND OF THE INVENTION

Phase change optical recording media employ a material that can undergo a reversible change in structure between an amorphous state and a crystalline state. Changing between these states is controlled by exposing the 'active material' to different levels of focused laser light energy. Typical commercially available active materials having this capability include alloys, such as $Ge_xSb_yTe_z$ and modified SbTe eutectics. The optical device is usually designed so that when the active material is in the amorphous phase, the measured reflectivity of the device is lower than when it is in the crystalline phase, e.g. an amorphous mark is written onto a crystalline track. The conventional use of this technology is to record data by varying both the frequency and length of the marks (amorphous regions) as well as the frequency and lengths of the spaces that separates the marks (crystalline regions). Each time a transition occurs, e.g, change from an amorphous to crystalline region of the track (or vise versa), a logical "1" may be defined. If no transition occurs within a timing period, then a logical "0" may be defined. In this scheme, it is important that the width of the marks remain constant, regardless of the length. If the laser were to expose the medium at a constant power level when attempting to "write" long marks, the accumulated thermal energy during the writing process could either cause the mark width to grow continuously, or cause recrystallization of the mark. For this reason, the creation of the mark may involve modulation of the laser power level, i.e., "cool-down" times are introduced. In one CD-RW-like write strategy, the laser power modulates between two levels: the low (L) is between 0.5 and 1.0 mW, while the high (H) is between 8 and 12 mW. For a disk operating at a nominal speed of "2X" (=2.4 m/s), a wavelength of 780 nm and a numerical aperture (NA) of 0.55, the timing period (T) is 115.5 ns. The smallest mark is written over a time span of 3T, while the longest mark is written over a span of 14T. An NT mark is written using the following modulation: 1TH+(N−1)(0.5TL+0.5TH). In this case, the narrowest laser pulse width that is used is 0.5T, i.e., 58 ns. This conventional recording strategy involves just two reflectivity levels (high for crystalline, and low for amorphous) and is thus termed bi-level recording.

In an attempt to increase the data storage density over the conventional bi-level method described above, a multi-level recording strategy has been envisioned. In this method, a mark of "fixed" length and width is created in such a way that the measured reflectivity has a multitude of levels, i.e., anywhere between the lowest possible reflectivity defined by a "pure" amorphous phase, and the highest possible reflectivity defined by a "pure" crystalline phase. See for example, U.S. Pat. No. 5,148,335 issued on Sep. 15, 1992 to Kudo et al., the disclosure of which is herein incorporated by reference. Disclosed therein is a multilevel optical recording strategy using marks of constant size and varying intensity, the marks being disposed between spaces.

Although the write strategy of Kudo may be theoretically possible, the write strategy described therein has been found to be impractical because a host of problems arise when writing the type of marks shown therein. For example, the trailing edge of the marks tends to have limited definition due to the significant amount of mark recrystallization. This is evident in the planar XY as well as in the cross-sectional XZ directions. The limited definition of this edge in turn limits the jitter of the recorded signal. As a result of this "soft" edge, mark-edge detection as a read-back strategy suffers. This reliance poses additional problems in the real world, where the reflectivity of even a virgin track (i.e., containing no marks) often varies cyclically around the disk (i.e., as it rotates) due to the variability often caused by focus and tracking problems typically associated with disk warping.

One reported write strategy designed to overcome some of the short falls of write strategies such as Kudo's is to form marks using large quantities of energy or high thermal load to overwhelm the local thermal environment where the mark is to be written. By overwhelming the local thermal environment with a high thermal budget, recrystallization of part of the mark and part of previously written marks occurs. Although this write strategy has been reported to provide higher density data storage, by overwhelming the local thermal environment the size of the mark expands can excessively result in significant cross-talk between marks on different tracks.

SUMMARY OF THE INVENTION

The present invention addresses the above mentioned deficiencies and others by providing a method of recording information to a state-changeable optical recording media using marks where each mark is formed by applying a plurality of energy pulses to said media. The pulses have duration and amplitude effective to permit at least 50% capacitive cooling and preferably at least 55% capacitive cooling during mark formation.

In another aspect of the present invention each mark may be formed by applying a plurality of energy pulses having short pulse widths to said media. When short pulses are used, the appropriate pulse width may be determined by the thermal time constant of the device, and/or by the recrystallization rate of the phase change material. Each pulse width is preferably less than 14 nanoseconds.

By maximizing capacitive cooling or by using a plurality of pulses having a short pulse width, three things may be possible: (1) mark shape can be independently controlled; (2) a high level of uniformity in crystal fraction formation in both the planar and thickness directions can be achieved; and (3) minimal to no influence upon previously written marks may be experienced.

Mark shape may be accomplished in a number of ways. The precise shaping of a mark can be accomplished by using two (or more) pulses per mark, by adjusting the amplitude (power) of each pulse and by adjusting the duration (width) of each pulse. Mark shaping may also be achieved by adjusting the period between the pulses. Pulse adjustment determinations may be based upon (i) the physical length of the data cell; (ii) the linear track velocity a disk operates at;

(iii) the actual number of pulses desired per mark; and (iv) the minimum width of the mark.

In accordance with another aspect of the present invention there is provided a multilevel recording strategy. In a multilevel recording strategy, marks provide more than 2 recording levels. In a multilevel recording strategy, each of the marks can be formed using a plurality of energy pulses. In one embodiment, the pulse characteristics are chosen so as to permit at least 50% capacitive cooling. In another embodiment, the pulses are chosen to have relatively short pulse widths (i.e., preferably below about 14 nanoseconds). In a preferred aspect hereof, the multilevel recording device has a plurality of predetermined data cells of uniform dimension where each mark formed is provided entirely within a corresponding data cell. The mark may be written in such a way as to avoid altering or significantly altering marks of other data cells. In another preferred aspect hereof, mark recording levels are differentiated by mark width while keeping mark length essentially constant.

In accordance with another aspect of the present invention there is provided a low thermal budget recording strategy designed to minimize mark enlargement, spurious mark formation, mark recrystallization and back crystallization. The low thermal budget strategy provides a method for minimizing the amount of energy in excess of that needed to form a mark and dissipates this excess energy in such a way that mark integrity is not comprised.

Hence, by using a recording strategy in accordance with the present invention, the effects of capacitive cooling and/or benefits of a low thermal budget strategy can be taken advantage of to improve mark formation, to reduce crosstalk, and to minimize jitter.

For a more complete understanding of the present invention, reference is made to the following detailed description and accompanying drawings.

DETAILED DESCRIPTION OF THE PREFERRED EMBODIMENTS

In accordance with a preferred embodiment, the present invention provides a method of recording information to a state-changeable optical recording medium by making a series of differentiable marks where each mark is formed with a plurality of energy pulses effective to provide at least 50% capacitive cooling. In accordance with another preferred embodiment, the present invention provides a method of recording information to a state-changeable optical recording medium through a low thermal budget strategy designed to minimize mark enlargement, stray mark formation, recrystallization and back crystallization.

The state-changeable optical recording medium may be any device having a memory material capable of changing from a first state to a second state in response to the input of energy, such as projected optical beam energy, electrical energy or thermal energy.

The state-changeable optical recording medium is preferably a non-ablative, optical phase change disk. The optical phase change disk may be of the type having a series of layers, including for example, protective layers, a reflective layer, an upper dielectric, an active layer or phase change layer, a lower dielectric, and a disk substrate. The optical phase change disk may also be configured or layered in other ways where layers act to control reflectivity, heating and cooling, and heat distribution.

The optical recording device has a state-changeable data storage medium or active material. The state-changeable data storage medium is any reversibly changeable material capable of changing state according to an input of energy, such as a chalcogenide material or phase change alloy. The state-changeable data storage medium may be provided in any suitable form, including a discrete, single layer of phase change material, optically tuned multiple layers, or any other form suitable for storing data. The data storage medium is preferably a thin film of phase change material. The phase change material preferably includes at least one element or combination of elements selected from the group consisting of Te, Ge, Sb, Se, In, and Ag. A preferred phase change material is a chalcogenide which includes Te or Sb as a main component, $Ge_xSb_yTe_z$, $Ag_wIn_xSb_yTe_z$, etc. For other examples of phase change materials applicable to the present invention, see U.S. Pat. Nos. 5,912,104; 4,653,024; 4,820,394; 4,737,934; 4,710,899; 5,912,104; 5,128,099; and 5,935,672, the disclosures of which are herein incorporated by reference.

A phase change material (which is useful as a data storage material of an optical disk) typically has a crystalline state and an amorphous state. The data storage material is typically deposited in an amorphous state during manufacture and initialized into a crystalline state to prepare it for recording. Data may then be recorded or stored to the phase change medium by making a series of amorphous marks.

Hence, data is recorded to the state changeable recording media by making a series of marks on the media. Generally, a mark may be any differentiable indicia formed upon the state-changeable recording media. Preferably the marks are non-ablative and provide a means for recording information or data which can be read from the phase change optical recording medium by detecting a variance in reflectivity. In a phase change media, the marks may be formed as at least partially amorphous regions of the phase change material and preferably, the marks are substantially entirely amorphous.

The marks may be made using any suitable energy source, including lasers, induction heating, resistive heating elements, etc. Preferably, the marks are formed using a source of optical energy, such as a laser. According to one aspect of the present invention, each mark may be formed by applying at least two energy pulses to the optical recording media. The shape of each mark may be controlled by adjusting the parameters of the pulses. For example, the amplitude (power) of each pulse and/or the duration (width) of each pulse and/or the period between pulses are all parameters that may be adjusted to change the shape of the mark. By appropriately adjusting the pulse parameters, it may be possible to form a mark which has a uniform width or one which has a tapering width. The appropriate pulse parameters chosen may at least partially depend upon (i) the physical length of the mark to be written, (ii) the linear track velocity a disk operates at, (iii) the actual number of pulses desired per mark, and (iv) the minimum width of the mark.

While not wishing to be bound by theory, it is believed that the cooling behavior of an optical recording media has several different components. One component is a relatively slow cooling component that is related to the conductive (i.e., resistive) flow of the thermal energy. This resistive component is referred to herein as "conductive cooling". Another component is a relatively fast cooling component which is related to the capacitive (i.e., reactive) storage of thermal energy. This reactive component is referred to herein as "capacitive cooling". The cooling behavior of an optical media (that this, the relative amounts of conductive cooling and capacitive cooling) depends upon several factors. For example, the cooling behavior depends upon characteristics which are intrinsic to the media—that is, the properties and structure of the optical recording media itself. The material properties include the thermal conductivity as well as the specific heat of the optical recording materials. The cooling behavior also depends upon extrinsic factors which are imposed by how the optical energy is applied to the media. For example, the cooling behavior depends upon the parameters of the energy applied to the media. Hence, the relative amounts of capacitive versus conductive cooling of an optical recording media (and hence the overall cooling rate of the media) may be controlled by adjusting the parameters of the applied energy source used to form marks. In a preferred embodiment, the applied energy source is in the form of energy pulses applied to the media when forming the marks.

As noted in one embodiment above, each of the marks is formed by applying a plurality of energy pulses. In one embodiment of the present invention, the parameters of the pulses are chosen so as to increase the percentage of capacitive cooling of the active material. More specifically, the parameters of the energy pulses may be selected so that capacitive cooling accounts for at least 50 percent of the total cooling of the active material—that is so that there is at least 50% capacitive cooling. Preferably, capacitive cooling dominates any other cooling. The parameters of the energy pulses and the optical memory device may be paired so that there is preferably at least 55% capacitive cooling, more preferably at least 60% capacitive cooling, and most preferably at least 70% capacitive cooling. Hence, the marks are produced by an energy pulsing scheme designed to emphasize capacitive cooling over conductive cooling and by increasing the relative proportion of capacitive cooling, the overall cooling rate of the active material may be achieved.

Figure 2:
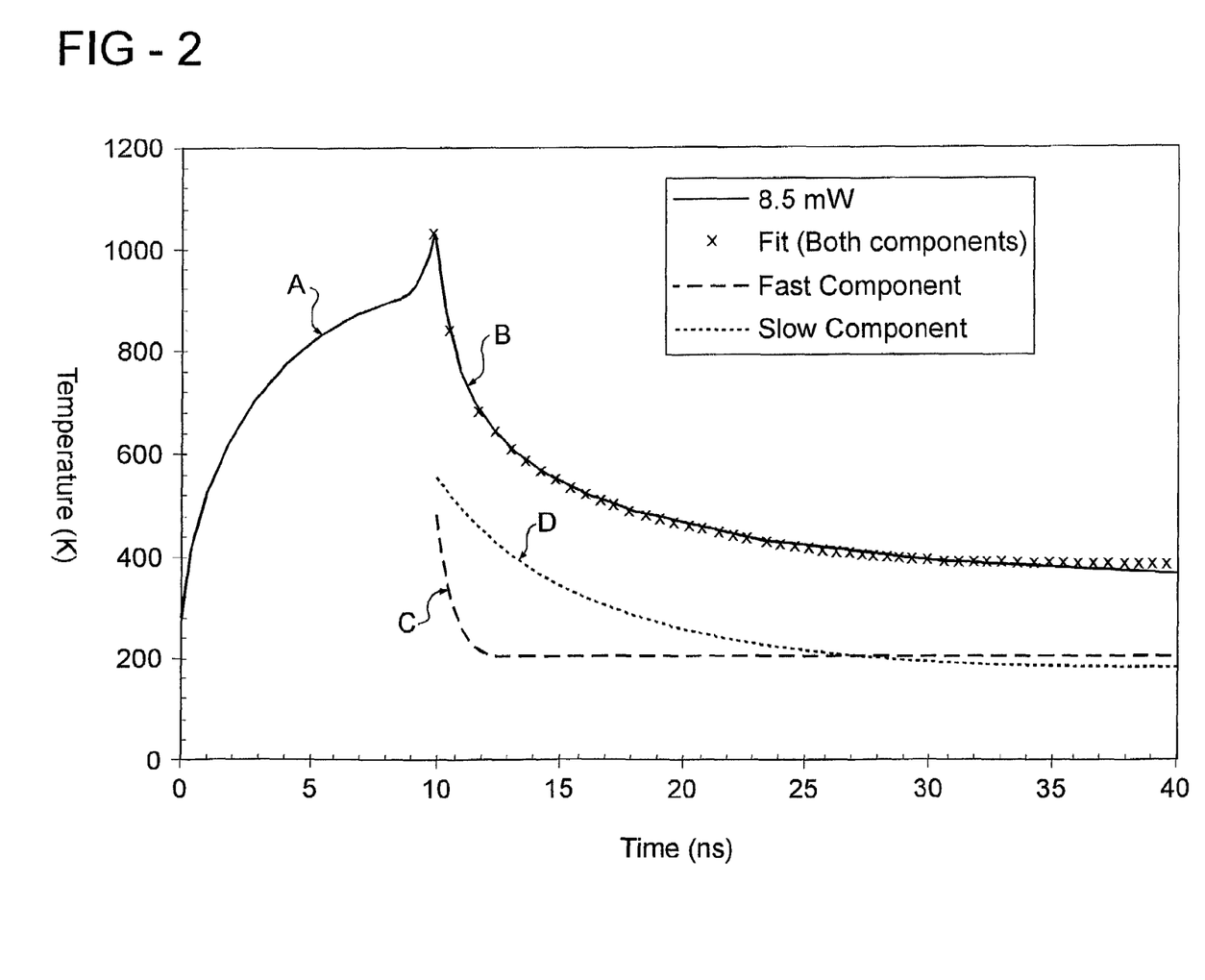
FIG. 2 is a diagrammatic view portraying heating and cooling of a memory medium using a method in accordance with the present invention.

As noted above, capacitive cooling is a relatively fast cooling component while conductive cooling is a relatively slow cooling component of the overall cooling rate of the optical media. By appropriately selecting the parameters of energy pulses used when writing to the optical media, it is possible to increase the overall cooling rate of the media. FIG. 2 shows the temperature profile at the middle of an active material layer of an optical memory disk irradiated with a short 10 nanosecond laser pulse. Plot A shows the heating of the optical recording media from time 0 to time 10 ns. At time 10 ns, the media starts to cool, as shown by Plot B. FIG. 2 shows that there is very rapid initial cooling followed by slower cooling at longer times. In spite of the complexity of the optical disk system, the overall cooling behavior may be characterized by a linear combination of just two exponential decay functions, i.e., $$T_f = F_{fast} C + F_{slow}(1-C),$$

Where $$F_{fast} = T_{ai} e^{-(t-t_0)/a} + T_{af}(1 - e^{-(t-t_0)/a}), \text{ and}$$

$$F_{slow} = T_{bi} e^{-(t-t_0)/b} + T_{bf}(1 - e^{-(t-t_0)/b}).$$

Here, C is the fraction of the fast capacitive component, and to is the time at the beginning of the cooling period (i.e., =10 ns). Components a and b are the fast and the slow cooling time constants, respectively, $T_{ai}$ and $T_{af}$ are related to the initial and final temperatures in the exponential decay for the fast component, and similarly with $T_{bi}$ and $T_{bf}$ designate the slow component.

The initial cool down has a fast cooling time constant "a" that is less than about 1 nanosecond and is primarily governed by the capacitive cooling component (which is dependent upon factors that include the relative heat capacities of the chalcogenide and the dielectric layers). In contrast, the slower cooling component has a cooling time constant "b" that is greater than about 6 nanoseconds and is governed by the conductive cooling component (which is dependent upon the thermal conductivities of the chalcogenide and dielectrics). The faster, capacitive cooling component of the overall cooling is shown by the calculated Plot C. The slower conductive cooling component is shown by the calculated Plot D. Hence, by carefully adjusting the parameters of the energy pulses or applied energy source used to write information to the optical media, it is possible to control the cooling rate of the media.

It is noted that by emphasizing capacitive cooling it is possible to improve the control over shaping of marks. It may also be possible to write marks with minimal influence upon previously written marks. Furthermore, it may be possible to achieve a high level of uniformity in crystal fraction formation in both the planar and thickness directions of the optical media.

In one embodiment, the appropriate cooling behavior may be achieved by applying energy pulses with relatively short pulse widths to conventional optical memory devices and others. The short pulse widths can be determined based upon the thermal time constant of the device, and/or by the recrystallization rate of the phase change material. In one embodiment of the present invention, each of the marks is formed by a plurality of energy pulses where each of the pulses has a pulse width which is preferably less than 14 nanoseconds, more preferably less than 10 nanoseconds, and most preferably less than 7 nanoseconds. Additionally, the pulse width may be less than 2 nanoseconds, preferably less than 1 nanosecond, and more preferably less than 500 picoseconds.

As discussed above and further below, the thermal management of mark formation (and ultimately mark shape) may also be influenced by properties which are intrinsic to the optical recording media including the material properties as well as the structure of the media. These properties may be adjusted and include one or more of the following:

(1) An active phase change layer (element) with a low thermal heat capacity. This facilitates a rapid heating as well as rapid cooling.

(2) A very thin active phase change layer. A very thin phase change layer may facilitate a lower thermal resistance to the cooling elements because the thermal conductivity of chalcogenide materials tends to be low. In addition, a smaller thickness provides less total heat content that eventually needs to be carried away.

(3) Passive elements adjacent to the active element that have a high heat capacity. A high heat capacity adjacent to the active element enhances the contribution of the fast cooling component.

(4) The thickness of the dielectric between the memory material and reflective layer (D2 layer) should not solely be adjusted for thermal considerations, but should also be adjusted for optical coupling purposes. Although it is true that a thinner D2 layer can lead to lower time constants of the slow cooling component, (5) A recording strategy with short energy pulses can be used to take better advantage of the fast cooling component of capacitive cooling.

In accordance with another aspect of the present invention there is provided a multilevel recording strategy which utilizes a mark which provides for more than 2 recording levels, e.g. has more than 2 bits of information when a '0 state' or blank is considered. Each mark may be formed with the method of the present invention as described above.

The multilevel recording strategy preferably includes use of data cells of uniform dimension. Mark formation is preferably provided entirely within the boundaries or dimensions of a corresponding data cell. The mark may be written in such a way as to avoid altering or significantly altering marks of other data cells. In a preferred aspect of the multilevel recording strategy, recording levels are differentiated by mark width, while mark length is essentially kept constant. By forming marks with multiple detectable levels using the methods of the present invention, the effects of capacitive cooling can be taken advantage of to improve mark formation, to reduce cross-talk and minimize jitter.

Figure 1:
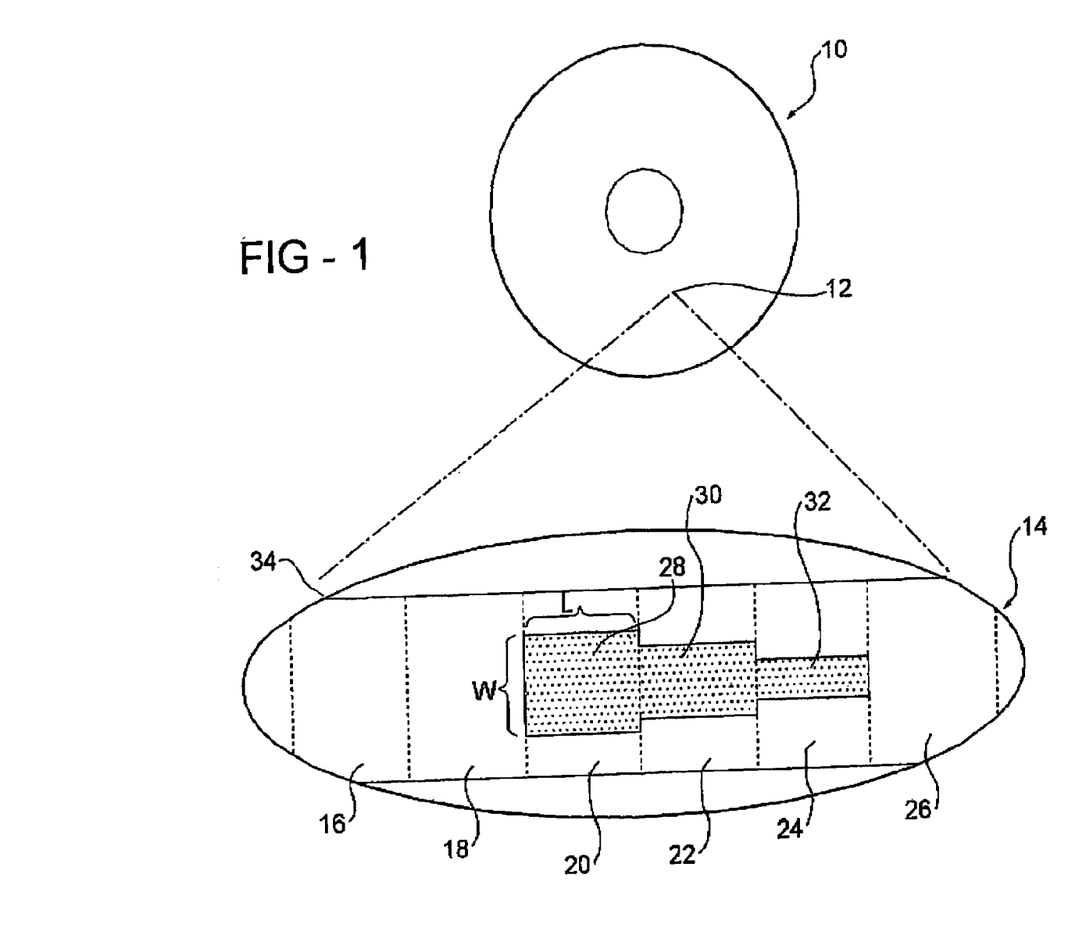
FIG. 1 is a plan view of an optical phase disk with a recording track, and an exploded view thereof having a plurality of marks formed with the method in accordance with the present invention.

Referring now to FIG. 1, generally depicted therein at 10 is a plan view of an optical disk with an exploded view 14 taken at 12 of a partially recorded track 34. The track 34 is divided into a plurality of predetermined data cells 16, 18, 20, 22, 24, 26 of uniform dimension (as shown by the dotted lines which are depicted for illustration purposes only). The track 34 is recorded with a plurality of marks 28, 30, 32, the marks formed for multilevel recording having multiple recording levels to allow for more than 2 bits of information. The marks are written to the track 34 using the methods of the present invention as described in detail herein above and below. The recording level of each mark is differentiated by the areal or volume fraction of the crystalline/amorphous states per data cell. The marks 28, 30, 32 are amorphous and provide three different levels of reflectivity. As shown, the recording levels are determined by mark width W while mark length L is kept constant between marks. Thus, a data cell having a mark with a narrower width, such as mark 32, will have a relatively higher reflectivity value than data cell 20 having a wider mark, such as mark 28.

Mark shaping using the method of the present invention can also be used to limit the amount of recrystallization of the mark itself. This mark 'self' recrystallization can occur when the local region surrounding a mark is over-heated to the extent that conductive cooling dominates mark cooling (i.e. >50%). Over-heating results in a relatively long cooling time. The extended cooling time allows a mark, which has been formed to be amorphous, to significantly recrystallize. Self recrystallization may result in substantial mark size shrinking. In some circumstances, the mark size may be reduced by 1% or more, but can be as high as 10%, 50%, or even as much as 100%. By using mark shaping in accordance with one or more aspects of the present invention, marks can not only be written without significant self recrystallizing but can be written without altering other marks, such as those of adjacent data cells and can also be used to dramatically improve mark edge detection. Additionally, by avoiding significant self recrystallization, marks can be written in a continuous fashion along data cells, e.g. marks completely filling the length of a corresponding data cell.

The application of energy from an external source to a phase change material provides a means for depositing or adding energy to the phase change material. The amount of energy deposited depends on the amount of applied energy and the fraction of the applied energy transferred to the phase change material. In a preferred embodiment, transfer of energy from an external source to the phase change material occurs through absorption. Stronger absorption leads to a greater addition of energy to the phase change material.

Energy added to the phase change material causes its temperature to increase. The temperature of the phase change material increases as energy is applied. Upon sufficiently long exposure to an external energy source, the temperature of the phase change material saturates at a maximum value. When the external energy source is removed, the temperature of the phase change material decreases. Examples of a temperature increase during the application of a laser pulse and temperature decrease upon removal of the laser pulse are presented in FIG. 2 herein.

The magnitude of the temperature increase, maximum attainable temperature, heating rate and cooling rate of the phase change material depend on factors such as the amount of energy deposited, the spatial profile of the applied energy, the thickness of the phase change layer, the area or volume over which the applied energy is added, the thermal conductivity and heat capacity of the phase change material as well as on the presence, thickness, chemical composition, thermal properties etc. of other layers that may be present in the stack or structure in which the phase change layer is present.

An objective of the instant invention is the shaping of amorphous marks. In order for a mark to form, sufficient energy must be applied to raise the temperature of the phase change material high enough to permit formation of an amorphous phase. The shape of an amorphous mark is influenced by the spatial profile of the applied energy, the duration over which energy is applied and the fate of the energy within the phase change material and any surrounding or adjacent layers.

The spatial profile of the applied energy refers to the spatial distribution of the energy provided by an external source. The spatial profile defines the boundaries of the applied energy and the intensity, power or other measure of the strength of the energy within those boundaries. The boundaries of the applied energy define the spatial region over which energy is provided by the external source. Regions within the boundaries receive energy directly from the external source, while regions outside of the boundaries do not. Alternatively, the boundaries of an energy source may be viewed in terms of the regions of space or other media through which the energy provided by the source propagates. The boundaries of an optical energy source, for example, denote the transition from non-zero light intensity to zero light intensity. Spatial regions that are illuminated receive non-zero light intensity and are within the boundaries of an applied optical energy source whereas unilluminated spatial regions are outside of the boundaries. When applied to a phase change material or other medium, the boundaries of an external energy source define the region of spatial overlap of the energy source with the phase change material. When an external optical source, for example, is applied to a phase change material, the region of spatial overlap corresponds to the portion of the phase change material that is illuminated as the optical energy propagates through the material. Points within the region of spatial overlap are directly acted on by the applied energy at the time of incidence or are in the path of propagation of the applied energy. The spatial overlap includes so-defined points on the surface and within the volume of the phase change material.

The spatial profile of the applied energy may be uniform or non-uniform. In a uniform spatial profile, the intensity of energy is substantially the same within the boundaries of the applied energy. A hot surface heated so that the temperature of the surface is substantially the same at all points, for example, may be used as a uniform thermal energy source. In a non-uniform spatial profile, the intensity of energy varies spatially within the boundaries of the energy source. Many external optical energy sources have non-uniform spatial profiles. In a typical laser beam, for example, light intensity varies spatially within the boundaries of the beam according to an intensity distribution in which the center of the beam has the highest intensity with the intensity decreasing according to a Gaussian function within the boundaries of the beam at positions away from the center of the beam.

The spatial distribution determines the spatial overlap of the applied energy with the phase change material as well as the strength of interaction of the external energy source with the phase change material at specific positions within the region of spatial overlap. An external energy source with a uniform spatial profile will have a substantially similar effect on all points within its region of spatial overlap with the phase change material. An external energy source with a non-uniform spatial profile will have a variable effect on different points within the region of spatial overlap. The variable effect occurs according to the distribution of intensity or strength of the energy source within its boundaries. As an example, consider the propagation of a laser beam with a Gaussian intensity profile through a phase change material. If the beam is directed perpendicular to the surface of the phase change material, the region of spatial overlap is expected to be substantially cylindrical with the beam exerting its greatest effect along the longitudinal axis of the cylinder since the intensity of a Gaussian laser beam is highest at the center. Other points in the region of spatial overlap will be affected to a lesser degree according to the Gaussian intensity profile of the laser beam. Points outside of the cylinder are external to the region of spatial overlap and not directly affected by the Gaussian beam as it propagates through the phase change material.

The spatial profile of the applied energy influences the shape of an amorphous mark by defining the area of contact or spatial overlap of the applied energy with the phase change material. In the absence of complementary effects, such as those described hereinbelow, amorphous marks may only be formed within the region of spatial overlap because this region represents the portion of the phase change material to which energy is added. If sufficient energy is added to raise the temperature to or above the temperature required to form an amorphous phase, a mark will be formed. The shape and dimensions of a mark are thereby determined by the spatial profile of the applied energy. If the distribution of intensity within the boundaries of the applied energy is such that all points within the region of spatial overlap are heated to a temperature sufficient to form an amorphous phase, the mark will coincide with the entirety of the region of spatial overlap. If only selected points within the region of spatial overlap are heated to a temperature sufficient to form an amorphous phase, the mark will coincide with only those points. Thus, a mark may wholly or partly coincide with the region of spatial overlap of the applied energy and the phase change material.

It may therefore be possible to control the shape of a mark by controlling the spatial profile of the applied energy because the spatial profile establishes a temperature profile within the phase change material and this temperature profile is determinative of whether a mark may form. The temperature profile describes the spatial distribution of temperatures attained at positions within the phase change material as a consequence of the applied energy. At the time of initial incidence, the temperature profile is established in the region of spatial overlap of the applied energy with the phase change material because it is this region that is directly affected by the applied energy. The initial temperature at each position in the region of spatial overlap is characteristic of the intensity or strength of the applied energy at that position. At times later than initial incidence, the temperature at each position varies. If the phase change material continues to be exposed to the applied energy after initial incidence, for example, the temperature at a position may increase as a result of the additional energy transferred to the phase change material. The temperature at a position may also decrease (or increase at a rate less than expected based solely on the applied energy) because of dissipation or other forms of energy transport within the phase change material. The effects of energy transport are described in more detail hereinbelow.

In addition to the spatial profile of the applied energy, the time of application or duration of applied energy is another factor that influences the shape of a mark. If the temperature at a position upon initial incidence of the applied energy with the phase change material is below the temperature required to form an amorphous phase, a mark will not initially form at that position. Continued application of the energy source may lead to mark formation, however, if the additional energy provided upon prolonged exposure is sufficient to raise the temperature of the position above the temperature required to form an amorphous phase.

The duration of applied energy also may influence mark formation even if sufficient energy is added to increase the temperature of the phase change material to or above the temperature required to form an amorphous phase because the phase change material must exist at or above the temperature required to form an amorphous phase for a sufficiently long period of time in order for a mark to form. One example of this phenomenon is superheating, an effect in which the crystalline phase of a material is retained even though its temperature is raised above a temperature from which an amorphous phase may be produced. Superheating occurs when the time interval over which the temperature is sufficiently high to permit formation of an amorphous phase is too short. Thus, control of the duration of applied energy may provide control over the shape of a mark in at least two ways.

A third factor in addition to the spatial profile and duration of the applied energy that influences the shape of a mark is the fate of the energy added to the phase change material by the energy source. The energy directly added to specific positions or regions of a phase change material does not remain at those positions or within those regions indefinitely, but rather may be transported to other positions or regions in the phase change material. Conductive and capacitive cooling processes are examples of mechanisms that transport energy from one portion of a phase change material to another or from a phase change material to adjacent or surrounding materials. The net effect of energy transport is a redistribution of energy from regions of high energy to regions of low energy. Thermal energy, for example, flows from regions of high temperature to regions of low temperature.

The transport of energy affects mark formation by influencing the temperature profile in a phase change material. The temperature profile of a phase change material depends on the rate of addition of energy to specific positions in the material as well as on the redistribution of energy between positions. As indicated hereinabove, mark formation requires heating of a phase change material to a sufficiently high temperature for a sufficiently long period of time. Energy transport may act to prevent attainment of the temperature required to form an amorphous phase at a particular position in the phase change material or may prevent a particular point of the phase change material from holding a sufficiently high temperature for a long enough period of time to form an amorphous phase.

Transport of energy further influences mark formation by providing a mechanism whereby portions of the phase change material outside of the region of spatial overlap of the applied energy with the phase change material receive energy indirectly. As indicated hereinabove, initial incidence of the applied energy on to the phase change material provides a mechanism for directly adding energy to the region of spatial overlap. This region is determined by the boundaries of the applied energy and its direction of propagation through the phase change material. Although portions of the phase change material outside of the region of spatial overlap do not directly receive energy, they may indirectly receive energy via transport of energy. Energy deposited in the region of spatial overlap may be transported to regions outside of the region of spatial overlap. This transport of energy represents an indirect mechanism of depositing energy into portions of the phase change material that do not directly interact with the applied energy. The indirect energy transport mechanism may lead to an increase in the temperature of the phase change material outside of the region of spatial overlap. Hence, energy transport influences the temperature profile of the phase change material.

From the point of view of shaping a mark, energy transport may lead to mark formation outside of the region of spatial overlap by indirectly providing energy. This effect may occur when the amount of energy provided indirectly outside of the region of spatial overlap is sufficient to raise the temperature of portions of the phase change material outside of the region of spatial overlap to a temperature at or above which is required for the formation of an amorphous phase. As a consequence, mark formation may occur outside of the region of spatial overlap. This effect may be undesired because it can lead to unpredictable mark formation, a tendency for mark enlargement or a reduction in storage density. Mark enlargement may lead to blurring of the boundaries of marks and may also lead to crosstalk between marks.

In order to control the shape of a mark, it is important to control the temperature profile of the phase change material. The factors that influence the temperature profile at a given time include the rate of addition of energy to the phase change material, the duration of the applied energy, the spatial profile of the applied energy and the rate of redistribution or transport of energy within the phase change material. The heating and cooling rates of a phase change material as well as specific points within the phase change material are influenced by these factors. The amount of applied energy deposited into the phase change material is hereafter referred to as the energy budget available for mark formation. In a preferred embodiment of the instant invention, the energy within the phase change material available for mark formation is thermal energy and the energy budget is a thermal energy budget that may be referred to as a thermal budget. The thermal budget may be received in the form of applied thermal energy or through the conversion of other forms of applied energy to thermal energy upon deposit in the phase change material.

Management of the thermal budget is an important factor in controlling mark formation and shape. Through management of the thermal budget, the temperature profile can be controlled and mark formation may be made to occur selectively in regions of a phase change material corresponding to a desired shape. One strategy for managing the thermal budget is to selectively apply or direct the thermal budget to the region of the phase change material over which a mark is desired to be formed. The thermal budget represents an amount of energy available for mark formation. As mark formation progresses and mark size increases, the thermal budget decreases until insufficient energy remains to further increase mark size. Cessation of mark formation occurs when the available thermal budget is insufficient to increase the temperature of a portion of the phase change material to a temperature sufficient to permit formation of an amorphous phase.

The shaping of marks may be accomplished through appropriate management of the thermal budget. The thermal budget required to form a mark of a given shape is determined by the volume of phase change material associated with the mark shape that must be increased to a temperature sufficient to permit formation of an amorphous phase. The lateral and vertical dimensions of a mark shape define the volume of phase change material associated with the mark. For a given mark size, a minimum thermal budget may be defined which corresponds to the minimum amount of energy necessary to raise all portions of the volume of phase change material associated with the mark to the minimum temperature sufficient to permit formation of an amorphous phase.

In principle, the depositing of the minimum thermal budget associated with a particular mark shape should be sufficient to form the mark. In practice, however, a minimum thermal budget strategy presents a number of complications. In order to be effective, a minimum thermal budget strategy requires that just enough energy be deposited at each point within the boundaries of a desired mark shape to raise the temperature to the minimum temperature capable of permitting the formation of an amorphous phase. One complication with the minimum thermal budget strategy is that it becomes necessary to know the minimum energy required to permit formation of an amorphous phase all points within the boundaries of a desired mark shape. This requires detailed knowledge of factors such as the local composition throughout the region of the desired mark and the minimum temperature capable of producing an amorphous phase from each point. If the phase change material is homogeneous, it may be possible to assume that all points within the boundaries of a desired mark require the same minimum amount of applied energy. Many materials, however, are heterogeneous and show non-homogeneous compositions on short length scales. A determination on a point-by-point basis of the minimum amount of energy required to form an amorphous phase for such materials may be difficult. Even if the point-by-point minimum energy is known, a minimum thermal budget strategy requires the availability of an external energy source that matches or can be adjusted to the providing of the point-by-point minimum energy within the desired boundaries of a mark. This may not be possible even if a uniform minimum amount of applied energy is required throughout the desired boundaries of the mark. The application of minimum energy on a point-by-point basis is further complicated by the fact that only a fraction of the applied energy is deposited in the phase change material and knowledge of this fraction may not be available.

Additionally, a minimum thermal budget strategy requires that any energy deposited remain at the point of deposition or at least, within the desired boundaries of the mark. Any energy transported to regions outside the desired boundaries of the mark represents lost energy that inherently defeats a minimum thermal budget strategy. It is likely not possible to prevent energy transport since the deposition of energy within the desired boundaries of a mark increases the temperature within those boundaries and creates a temperature gradient with respect to portions of the phase change material outside of the desired boundaries of the mark. Such a temperature gradient provides a driving force for the transport of energy. It may be possible to prevent or at least inhibit such energy transport if the deposited energy is consumed in the process of forming an amorphous phase on a time scale that is much shorter than the time scale associated with the transport of energy. This condition may be difficult to meet, however, because the phase change material must remain at or above a temperature sufficient to permit formation of an amorphous phase for a sufficiently long period of time in order for a mark to form. The required sufficiently long period of time becomes longer as the temperature achieved for the formation of an amorphous phase becomes lower. Since a minimum thermal budget strategy implies point-by-point establishment of the minimum temperature capable of producing an amorphous phase within the desired boundaries of a mark, a minimum thermal budget strategy acts to lengthen the amount of time at which the phase change material within the desired boundaries of a mark must remain at an elevated temperature. The length of time over which a temperature gradient exists relative to portions of the phase change material outside the desired boundaries of a mark is thereby increased as is the likelihood of energy transport.

Because of the difficulties associated with a minimum thermal budget strategy, it may be advantageous to use energy in excess of the minimum thermal budget when forming marks. This excess energy may be used to alleviate the complications associated with a minimum thermal budget strategy and may compensate for energy lost to energy transport and other processes. The presence of excess energy may introduce other complications, however, because of the ultimate need to dissipate or distribution any energy in excess of that required to form a mark with desired boundaries. Thus, even though excess energy may expedite the formation of a mark, it must nonetheless ultimately be disposed of or distributed in a way that is not deleterious to the goal of forming a mark with boundaries corresponding to a desired size or shape.

As an example, consider the use of the excess thermal budget to increase the temperature within the desired boundaries of a mark to a temperature above the minimum temperature required to form an amorphous phase. Such an increased temperature would likely decrease the time necessary for the formation of an amorphous phase, thereby facilitating mark formation. Once formed, however, the mark exists at a temperature higher than the temperature that would result in a minimum thermal budget strategy. The hotter mark necessarily must cool to its equilibrium temperature and the energy released during the cooling will likely dissipate to portions of the phase change material outside of the boundaries of the mark. If this dissipated energy leads to formation of an amorphous phase outside of the boundaries of the mark that has been formed, it leads to deleterious effects such as mark enlargement or spurious mark formation. These effects may occur if the dissipated energy is of sufficient duration and magnitude to increase the temperature of portions of the phase change material outside of the desired boundaries of the mark to a temperature sufficient to form an amorphous phase.

An additional complication may arise if the excess energy resides within the boundaries of the mark for a sufficiently long period of time after mark formation. Recrystallization of an amorphous phase may occur if an amorphous phase is heated, or remains heated after formation, for a sufficient amount of time. Recrystallization may occur at temperatures below those required for the formation of an amorphous phase and hence may occur during cooling of a newly formed amorphous if cooling occurs too slowly. Recrystallization is the process of converting an amorphous phase into a crystalline phase. The conditions for forming a crystalline phase from an amorphous phase can be described by TTT (time-temperature-transformation) diagrams that are well known in the art. TTT diagrams summarize the time at which an amorphous phase must remain at a particular temperature in order for a crystalline phase to form. Crystallization may occur over a range of temperatures bounded by a minimum temperature and a maximum temperature where the minimum and maximum temperature depend on the chemical composition of the phase change material. In order for crystallization to occur in a phase change material at the minimum temperature required for crystallization, the material must remain at that temperature for an extended period of time. As the temperature increases above the minimum temperature, the necessary time for crystallization decreases until at some temperature between the minimum and maximum temperatures capable of forming a crystalline phase, a minimum necessary time for crystallization is achieved. Further increases in temperature lead to a lengthening of the time required for crystallization until, at temperatures above the maximum temperature capable of forming a crystalline phase, crystallization no longer is possible. This maximum temperature is generally less than the melting temperature of the phase change material.

Thus, as the temperature is increased from the minimum temperature required for crystallization to the maximum temperature capable of forming a crystalline phase, the time required for crystallization decreases until a minimum time is achieved and then increases. This variation in the time required for crystallization reflects a balance between competing effects that are believed to be responsible for crystallization from an amorphous phase. These factors include the ability for atoms in the amorphous phase to rearrange into an intermediate configuration from which crystallization can occur and the ability of the phase change material to retain this intermediate configuration for enough time for crystallization to occur. At lower temperatures, the amount of thermal energy present is too low to permit the facile motion and reorganization of atoms in the amorphous phase that is conducive to the formation of a crystalline phase. Instead the motion is sluggish and the time required for crystallization is accordingly long. At higher temperatures, the amount of thermal energy present is sufficient to permit facile motion and reorganization of atoms in the amorphous phase. The motion, however, is so facile that the intermediate configuration of atoms that is conducive to crystallization is not present long enough to permit optimal crystallization. Instead the thermal energy disrupts the configuration before crystallization is complete.

A related crystallization effect occurs when energy present outside of the desired boundaries of a mark is transported (or re-transported) to within the desired boundaries of the mark. Energy may be present outside of the desired boundaries of a mark because it is directly delivered there by the applied energy source (as may occur, for example, if the spatial profile of the applied energy extends beyond the desired boundaries of a mark) or it may represent energy directly applied within the desired boundaries of a mark that has been transported. It is possible for energy present outside of the boundaries of a mark to return to within the boundaries of a mark. Such energy may induce crystallization of portions of the mark and compromise the quality of the mark. This effect may be referred to as back crystallization.

An effective excess thermal budget management strategy for optical recording and mark formation must therefore not only expedite mark formation within desired boundaries, but must also facilitate the non-deleterious disposition of the excess thermal budget. Effects such as mark enlargement, spurious mark formation, diffusion of mark boundaries, merging of spacedly disposed marks, recrystallization, and back crystallization need to be controlled.

The instant invention provides a strategy for recording information through the formation of marks of a desired shape. The strategy permits the application of energy in excess of the amount required in a minimum thermal budget strategy, but seeks to minimize the excess and hence may be referred to as a low thermal budget strategy. The strategy further addresses the need to dissipate the excess thermal budget in a non-deleterious manner. In the instant invention, management of the thermal budget is accomplished by the application of energy in the form of short energy pulses. The instant inventors have demonstrated that short energy pulses enhance the cooling rate and facilitate the dissipation of energy away from the desired boundaries of a mark. According to the instant invention, short energy pulses provide for more effective control of the thermal budget through better utilization of energy to form marks and the promotion of non-deleterious mechanisms of dissipation of the excess thermal budget.

One aspect of the instant invention is the ability of short energy pulses to enhance energy dissipation through a capacitive cooling mechanism relative to a conductive cooling mechanism. Capacitive cooling provides for faster cooling rates than conductive cooling. From the point of view of forming marks of a desired shape, enhancement of capacitive cooling is advantageous because faster energy dissipation minimizes the likelihood of forming an amorphous phase outside of the desired boundaries of a mark. When the excess thermal budget is rapidly transported, it passes outside of the desired boundaries of a mark without residing at any particular portion of the phase change material outside of the desired boundaries of a mark for a period of time sufficient to form an amorphous phase. Hence, the boundaries of a mark are better defined. Rapid energy transport also inhibits recrystallization because the elevated temperature of a mark as it forms rapidly decreases once the short pulse applied energy source is removed. A rapid temperature decrease minimizes the likelihood that the mark will remain at a temperature capable of producing a crystalline phase for a period of time sufficient to form a crystalline phase.

I claim:

1. A method of recording information to an optical recording medium comprising a phase change material, said method comprising the steps of:

applying energy having a spatial profile to said phase change material, said spatial profile defining a region of spatial overlap of said energy with said phase change material, said energy providing a temperature profile within said region of spatial overlap, said temperature profile defining a spatial distribution of temperatures, said spatial distribution including temperatures sufficient to permit formation of an amorphous phase in said region of spatial overlap;

forming a mark coinciding with the portions of said spatial distribution having a temperature sufficient to form an amorphous phase, said mark comprising an amorphous phase, said amorphous phase forming upon cooling of said region of spatial overlap, said cooling releasing energy in excess of the energy required to form said amorphous phase;

dissipating said excess energy to portions of said phase change material outside of the spatial region coinciding with said mark, said dissipating occurring at a rate sufficient to prevent formation of an amorphous phase in said portions outside of said mark.

2. The method of claim 1, wherein said energy is applied in the form of an energy pulse.

3. The method of claim 2, wherein said energy pulse has a pulse duration of less than 14 nanoseconds.

4. The method of claim 2, wherein said energy pulse has a pulse duration of less than 10 nanoseconds.

5. The method of claim 2, wherein said energy pulse has a pulse duration of less than 7 nanoseconds.

6. The method of claim 1, wherein said energy is applied in the form of a plurality of energy pulses.

7. The method of claim 1, wherein said energy is applied with a laser.

8. The method of claim 1, wherein said spatial profile is uniform.

9. The method of claim 1, wherein said spatial profile is a Gaussian profile.

10. The method of claim 1, wherein said phase change material comprises a chalcogenide.

11. The method of claim 1, wherein said phase change material comprises an element selected from the group consisting of Ge, Sb, Se, In, Ag and Te.

12. The method of claim 1, wherein said region of spatial overlap is substantially cylindrical.

13. The method of claim 1, wherein said temperature profile is uniform.

14. The method of claim 1, wherein said mark coincides with said region of spatial overlap.

15. The method of claim 1, wherein said mark provides for more than two recording levels.

16. The method of claim 1, wherein said cooling comprises capacitive cooling.

17. The method of claim 1, wherein said dissipating step comprises capacitive cooling.

* * * * *